June 26, 1945.  A. McL. NICOLSON  2,378,939
ECHO SOUNDING APPARATUS
Original Filed Dec. 16, 1938
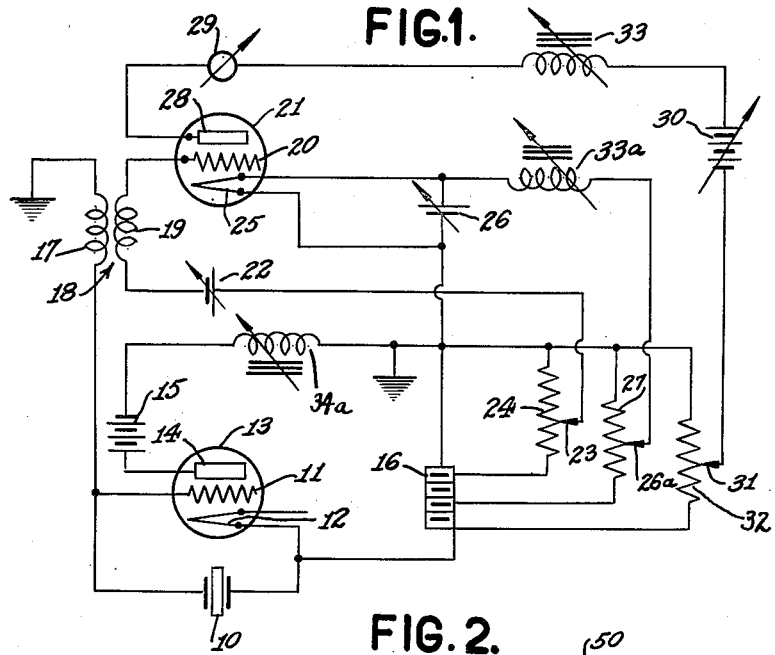
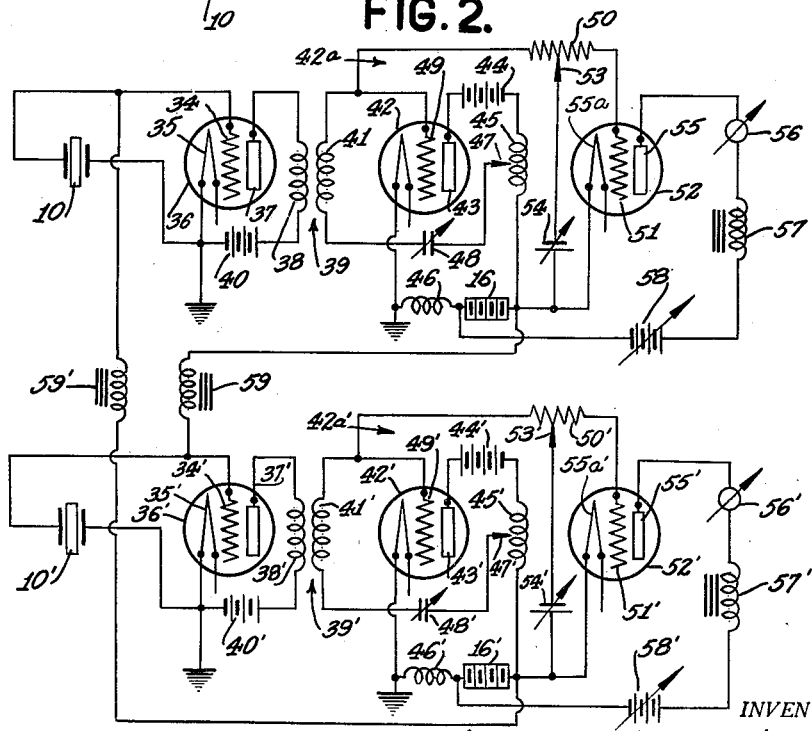
INVENTOR.
ALEXANDER McLEAN NICOLSON
BY
Hoguet, Neary & Campbell
ATTORNEYS.

Patented June 26, 1945

2,378,939

UNITED STATES PATENT OFFICE 2,378,939

ECHO SOUNDING APPARATUS

Alexander McLean Nicolson, New York, N. Y.

Original application December 16, 1938, Serial No. 246,130. Divided and this application February 24, 1943, Serial No. 476,879

10 Claims. (Cl. 177—352)

This invention relates to the art that I term "Wavemetry" and to wave detecting apparatus. It relates more particularly to new and improved apparatus for determining the direction and distance of a source of a wave echo.

This application is a division of my co-pending application for "Wave sensitive and wave front detecting devices," filed December 16, 1938, Serial No. 246,130, now abandoned.

An object of the invention is to provide new and improved apparatus for detecting wave echoes arising from the propagation of wave energy in a medium.

A further object of the invention is to provide new and improved echo sounding apparatus which responds only to an echo and not to the original wave front which produced the echo.

A still further object of the invention is to provide new and improved apparatus for indicating the order in which echo wave energy arrives at one or more points in a medium.

According to the invention, a detector of wave energy is provided which is normally unresponsive to the arrival of an initial wave front but is responsive to an echo wave front. The arrival of the initially propagated wave front at the detector prepares a circuit for the reception of an echo and renders it operative to indicate the arrival of the echo.

In a further embodiment of the invention the wave detecting apparatus comprises a plurality of detectors which are so interconnected that none of them will respond to an initially propagated wave front, but the one first to receive an echo will respond, the others giving no indication of the arrival of an echo.

The invention may be better understood from the following detailed description of several representative embodiments taken in conjunction with the accompanying drawing, in which:

Figure 1 is a schematic diagram of an echo detecting circuit constructed according to the invention, and Figure 2 illustrates schematically a circuit for indicating the order in which wave echoes reach spaced apart points in a medium.

For the sake of convenience, the invention will be illustrated as applied to the detection of mechanical vibration echoes. However, it will be readily understood that the apparatus may also be used to detect echoes of radio waves by substituting radio receivers for the mechanical vibration detectors employed in the illustrative embodiments described below.

In the embodiment shown in Figure 1, wave energy detecting means is connected to an amplifier, the output of which is impressed upon a polarization cell. The wave energy detecting means is also connected to second amplifying means which is normally inoperative but which is rendered operative by the application of voltage from the polarization cell to the circuit. As a result, the second amplifying means is not responsive to the wave initially propagated through the medium, but is responsive to an echo wave front produced by the reflection of wave energy from an object in the path of the propagated wave front.

Referring now to Figure 1, the wave energy detecting means comprises a conventional type crystal 10, for example, the opposite terminals of which are connected to the control grid 11 and the filament 12 of an electronic amplifying tube 13. The plate electrode 14 of the tube 13 is connected to the positive terminal of a source of plate voltage 15, the negative terminal of which is connected to one terminal of a polarization cell 16, another terminal of which is connected to the filament 12 of the tube 13. The polarization cell 16 may be of any conventional type and may comprise, for example, a plurality of platinum electrodes immersed in a dilute solution of sulfuric acid. It is well known that when a cell of this type is charged with electrical energy, it will discharge electrical energy for a certain period of time after the charging current has been removed. This period is sufficient for the reception of an echo in the present system.

The electrical energy generated by the crystal 10 upon the arrival of a wave front is also impressed upon the primary winding 17 of a transformer 18, one terminal of which is connected to the control grid 11 of the tube 13, and the other terminal of which is connected to ground. The secondary winding 19 of the transformer 18 has one terminal connected to the control grid 20 of a second electronic amplifying tube 21, and another terminal connected in series with a source of biasing voltage 22 to a variable contact 23 on a resistor 24 connected across part of the polarization cell 16.

The filament 25 of the tube 21 is energized by a source of voltage 26, one terminal of which is connected to ground and the second terminal of which is connected to a variable contact 26a on a second resistor 27 connected across another part of the polarization cell 16. The plate electrode 28 of the tube 21 is connected in series with a conventional type indicator 29 to the positive terminal of a source of plate supply 30, the negative terminal of which is connected to a variable contact 31 on a third resistor 32 connected across the polarization cell 16.

In operation, the circuit components associated with the amplifier tube 21 are adjusted so that it is inoperative but, nevertheless, just at the threshold of operation. This may be done by varying the source of plate supply 30, the filament battery 26, or the grid bias battery 22 of the tube 21, or all three of these factors, to bring the amplifying tube 21 just up to the threshold of operation. The variable contacts 23, 26a and/or 31 are then adjusted so that the arrival of a wave front at the crystal 10 will charge up the polarization cell sufficiently to render the amplifier tube 21 operative to actuate the indicator 29 when an echo wave front arrives at the crystal 10. A wave front is then generated in any conventional manner and is propagated through the medium in which the crystal detector 10 is located.

The arrival of the wave front at the crystal 10 causes it to generate a voltage which is impressed upon the control grid 11 of the first amplifying tube 13. This charges the polarization cell 16 which is connected in the plate circuit of the tube 13, thereby developing different voltages across the resistors 24, 27 and 32. The voltage impressed upon the resistor 24 is positive and, therefore, reduces the grid bias applied to the control grid 20 of the tube 21. The positive voltage impressed across the resistor 27 is connected across the filament battery 26 so that it increases the voltage applied to the filament 25, thereby increasing the electronic emission therefrom. The voltage impressed across the resistor 32 is positive and is added to the plate supply voltage 30, thus increasing the voltage applied to the plate electrode 28 of the tube 21. As a result of any one or all of these effects, the amplifying tube 21 is rendered operative so that when an echo wave front reflected from an object in the vicinity arrives at the crystal 10, the indicator 29 will be operated.

It will be readily apparent that it is not necessary to adjust the plate, grid and filament voltages of the amplifying tube 21 for the purpose of rendering it operative to signal the arrival of an echo at the crystal 10. In practice, any one of these factors will suffice to prepare the inactive tube 21 for operation. Moreover, the delayed operation of the detecting system may be further controlled by inserting other elements such as inductances 33, 33a and 34a in the plate and filament circuits of the tube 21 and in the plate circuit of the tube 13, respectively. Also, instead of utilizing a polarization cell, as described above, for the purpose of rendering the circuit operative to discriminate between an original wave front and an echo wave front, a retardation relay of the type disclosed in my prior Patent No. 1,464,104 may be employed.

Figure 2 illustrates schematically detecting means for determining and signalling the order of arrival of echoes at a plurality of spaced apart points in a medium through which wave energy is propagated. In this form of the device, the thermionic retardation is produced by plate potential threshold control of the type described above in connection with Figure 1. For the sake of simplicity, only two echo detectors are shown in the figure. However, any number of detectors may be employed as desired. Inasmuch as the detectors are substantially identical in construction, it will be necessary to describe only one in detail, corresponding parts of the second being designated by primed reference characters.

Considering now Figure 2, a conventional type crystal detector 10 has its opposite sides connected to the control grid 34 and to the filament 35 of an electronic amplifying tube 36. The plate electrode 37 of the tube 36 is connected in series with the primary winding 38 of a transformer 39 to the positive terminal of a source of plate supply 40, the negative terminal of which is connected to ground. The secondary winding 41 of the transformer 39 is connected in an oscillator circuit 42a including an electronic tube 42. The plate electrode 43 of the tube 42 is connected to the positive terminal of a source of plate supply 44. The plate supply 44 is connected in series with an inductance 45, a polarization cell 16 and a choke 46 to ground. A variable tap 47 on the inductance 45 is connected in series with a variable condenser 48 to one terminal of the secondary winding 41 of the transformer 39, the other terminal of which is connected to the control grid 49 of the tube 42.

The control grid 49 of the tube 42 is also connected in series with a resistor 50 to the control grid 51 of a second electronic amplifying tube 52. The resistor 50 is provided with a variable tap 53 which is connected in series with a variable source of biasing voltage 54 to the filament 55a of the tube 52 and to the polarization cell 16. The plate electrode 55 of the tube 52 is connected in series with a conventional type indicator 56 and a choke 57 to the positive terminal of a source of variable plate supply 58, the negative terminal of which is connected to the common point between the choke 46 and the polarization cell 16.

In order to determine the order in which echo wave energy reaches the crystals 10 and 10', the circuit is so designed that the detector at which the echo wave front arrives first suppresses the other detector and renders it inoperative to receive a signal. This is accomplished as shown in Figure 2 by connecting the negative side of the polarization cell 16, preferably through an inductance 59, to the control grid 34' of the tube 36'. In similar fashion, the negative side of the polarization cell 16' is connected, preferably through an inductance 59', to the control grid 34 of the tube 36.

Initially, the oscillators 42a and 42a' are adjusted so as to be just about at the threshold of oscillation, and the plate supplies 58 and 58' for the tubes 52 and 52' are adjusted to bring the tubes 52 and 52' just about to the threshold of operation. Also, the polarization cells 16 and 16' are so constructed that when charged by operation of the oscillators 42a and 42a', they will develop sufficient voltage to render the amplifier tubes 52 and 52' operative.

In operation, when wave energy from a wave front initially reaches the detector 10, the oscillator 42a will begin to oscillate and will charge the polarization cell 16. The voltage developed across the polarization cell 16 during the charging process is added to the plate supply voltage 58 and is sufficient to render the amplifying tube 52 operative. Accordingly, when an echo wave front arrives at the crystal 10, the indicator 56 will respond. At the same time, additional voltage is developed across the polarization cell 16 by the second response of the detector 10 and is impressed as a negative voltage upon the control grid 34' of the amplifying tube 36', thereby rendering the tube 36' inoperative so that the indicator 56' cannot indicate the arrival of the echo wave front at the detector 10'. Hence, if only the indicator 56 responds, an observer will know that the echo wave front reached the detector 10 first. Similarly, if the echo wave front arrives at the crystal 10' before the crystal 10, the indicator 56' will respond but the indicator 56 will not.

It will be apparent from the foregoing that the invention enables echo wave fronts to be readily discriminated from initial wave fronts propagated through a medium containing objects which reflect wave energy. If the velocity of the wave energy in the medium is known, the distance of the reflecting object can be readily determined from the time interval elapsed between the arrival of the initial wave front at the detector and the arrival of the echo wave front at the detector. Further, by employing two or more detectors so interconnected that the first one energized by a wave front renders the other inoperative, it is possible to determine the direction of the source of echo wave front.

Although only single stages of amplification are shown in the embodiments described above, obviously more stages may be employed if desired or necessary. Also, other wave detectors than crystals may be used with good results, and pentodes or other suitable tubes may be utilized instead of the triodes shown.

While several specific embodiments of the invention have been described above, the invention is not intended to be limited thereto. Those embodiments are, of course, susceptible of numerous changes in form and detail within the scope of the appended claims.

I claim:

1. Wave detecting apparatus comprising a plurality of detectors, each having associated therewith wave sensitive means, means for amplifying the output of said wave sensitive means, second amplifying means having reduced voltage applied thereto so as to render it normally inoperative but at the threshold of operation, electrical indicating means connected to be actuated by said second amplifying means, electrical means connected to said first amplifying means and rendered operative upon the arrival of an original wave front at said wave sensitive means for augmenting the voltage applied to said second amplifying means to render it operative, and electrical connections between the voltage augmenting means of each of said detectors and the first amplifying means of the other detectors to apply a voltage from the voltage augmenting means of the detector first to receive an echo wave front to the first amplifying means of the other detectors to render them unresponsive to the arrival of wave energy.

2. Wave detecting apparatus comprising a plurality of detectors, each having associated therewith wave sensitive means, means for amplifying the output of said wave sensitive means, second amplifying means having reduced voltage applied thereto so as to render it normally inoperative but at the threshold of operation, electrical indicating means connected to be actuated by said second amplifying means, a polarization cell connected to said first amplifying means to be charged thereby upon the arrival of an original wave front at said wave sensitive means and adapted, when charged, to augment the voltage applied to said second amplifying means to render it operative, and electrical connections between the polarization cell of each of said detectors and the first amplifying means of the other detectors to apply a voltage from the polarization cell of the detector first to receive an echo wave front to the first amplifying means of the other detectors suited to render them unresponsive to the arrival of wave energy.

3. Wave detecting apparatus comprising a plurality of detectors, each having associated therewith wave sensitive means, means for amplifying the output of said wave sensitive means, second amplifying means including an electronic tube having reduced plate voltage applied thereto so as to render it normally inoperative but at the threshold of operation, electrical indicating means connected to said second amplifying means, a polarization cell connected to said first amplifying means and adapted to be charged thereby upon the arrival of an original wave front at said wave sensitive means for augmenting the plate voltage applied to said electronic tube to render it operative, and electrical connections between the polarization cell of each of said detectors and the first amplifying means of the other detectors, whereby the polarization cell of the detector first to receive an echo wave front will apply a voltage to the first amplifying means of the other detectors to render them unresponsive to the arrival of wave energy.

4. In apparatus for determining the position of an object in a medium reflecting wave energy generated by a wave source, the combination of a plurality of devices for detecting the arrival of wave energy reflected from said object, a plurality of means adapted to be actuated by each of said devices for indicating the arrival of a reflected signal, means associated with each of said detecting means for preventing the indicating means corresponding thereto from responding to the arrival of an original wave front from said wave source, means energized upon the arrival of an original wave front at each of the detectors for rendering the indicating means corresponding thereto operative to indicate the arrival of an echo wave front reflected from said object, and means energized by the detector first to receive said echo wave front for rendering the other detectors unresponsive to wave energy.

5. In apparatus for determining the position of an object capable of reflecting waves generated by a wave source, the combination of a plurality of wave energy receivers, means associated with and actuated by each receiver for signalling the arrival of a wave front, said receivers being normally inoperative to actuate the signalling means corresponding thereto upon the arrival of a wave front, means responsive to the arrival of an original wave front from said wave source for raising said receivers to the threshold of operation without actuating the signalling means corresponding thereto, whereby said signalling means will be actuated upon the subsequent arrival of a reflected wave front, and means energized by the receiver first to receive a reflected wave front for rendering the other receivers inoperative to actuate their associated signalling means.

6. Echo sounding apparatus comprising wave sensitive means, a pair of wave channels connected to be actuated by said wave sensitive means, a polarization cell in one of said channels adapted to supply a voltage for a limited time when charged by reception of a wave in said first mentioned channel, wave amplifying means in the other of said channels supplied with a reduced voltage suited to render it normally inoperative but at the threshold of operation, said polarization cell being connected to augment the voltage supplied to said amplifying means and adapted when charged to render said amplifying means operative, and indicating means connected to respond to a received wave when amplified by said amplifying means.

7. Echo sounding apparatus comprising wave sensitive means, a pair of wave channels connected to be actuated by said wave sensitive means, wave amplifying means in each of said channels, a polarization cell connected to be charged by operation of the wave amplifier in one of said channels and adapted when charged to supply a voltage for a limited time, means supplying the wave amplifying means in the other of said channels with a reduced voltage suited to render it normally inoperative but at the threshold of operation, said polarization cell being connected to augment the voltage supplied to said last mentioned amplifying means and adapted when charged to render the same operative, and indicating means connected to respond to a received wave when amplified by said last mentioned amplifying means.

8. Echo sounding apparatus comprising wave sensitive means, a pair of wave channels connected to be actuated by said wave sensitive means, a polarization cell in one of said channels adapted to supply a voltage for a limited time when charged by reception of a wave in said first mentioned channel, wave amplifying means in the other of said channels supplied with a reduced bias voltage suited to render it normally inoperative but at the threshold of operation, said polarization cell being connected to augment the voltage supplied to said amplifying means and adapted when charged to render said amplifying means operative, and indicating means connected to respond to a received wave when amplified by said amplifying means.

9. Echo sounding apparatus comprising a plurality of channels each channel containing a wave sensitive means, wave amplifying means supplied with a reduced voltage suitable to render the same normally inoperative but at the threshold of operation, a polarization cell connected to be charged by the reception of a wave in said channel and when charged to supply a voltage for a limited time, and an indicating means connected to respond to a received wave when amplified by said amplifying means, each of said polarization cells being connected to augment the voltage supplied to the amplifying means in its channel to render the same operative when charged by a received wave, and being connected to apply a blocking voltage to the other channels, said blocking voltages being suited to render said other channels inoperative when said cell is further charged due to the reception of an echo wave in its channel, whereby only the first channel to receive an echo wave is responsive thereto.

10. Echo sounding apparatus comprising a plurality of channels each channel containing a wave sensitive means, a first amplifying means, an oscillator and a second amplifying means, said oscillator and said second amplifying means being supplied with reduced voltage suitable to render the same normally inoperative but at the threshold of oscillation and operation, respectively, a polarization cell connected to be charged by the reception of a wave in said channel and when charged to supply a voltage for a limited time, and an indicating means connected to respond to a received wave when amplified by said second amplifying means, each of said polarization cells being connected to augment the voltage supplied to the oscillator and to the second amplifying means in its channel to render the same operative when charged by a received wave, and being connected to apply a blocking voltage to the first amplifying means in the other channels, said blocking voltages being suited to render said first amplifying means inoperative when said cell is further charged due to the reception of an echo wave in its channel, whereby only the first channel to receive an echo wave is responsive thereto.

ALEXANDER McLEAN NICOLSON.